(12) United States Patent
Koyama et al.

(10) Patent No.: US 8,643,899 B2
(45) Date of Patent: Feb. 4, 2014

(54) DEVICE, METHOD, SYSTEM, AND COMPUTER PROGRAM PRODUCT FOR DETERMINING AMOUNT OF COLORANT TO MAINTAIN THICKNESS OF PRINTED LAYER IN REGIONS OF MOLDED OBJECT BASED ON DEFORMATION OF PRINT MEDIUM

(75) Inventors: Minoru Koyama, Nagano (JP); Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 13/419,521

(22) Filed: Mar. 14, 2012

(65) Prior Publication Data

US 2012/0237667 A1 Sep. 20, 2012

(30) Foreign Application Priority Data

Mar. 14, 2011 (JP) .................................. 2011-055165
Mar. 16, 2011 (JP) .................................. 2011-057687

(51) Int. Cl.
| | |
|---|---|
| G06K 15/02 | (2006.01) |
| H04N 1/387 | (2006.01) |
| H04N 1/60 | (2006.01) |
| B41M 3/00 | (2006.01) |
| B41J 2/21 | (2006.01) |
| B29C 37/00 | (2006.01) |
| G06K 15/10 | (2006.01) |

(52) U.S. Cl.
CPC ........ *G06K 15/1868* (2013.01); *G06K 15/1878* (2013.01); *H04N 1/387* (2013.01); *H04N 1/6002* (2013.01); *H04N 1/6016* (2013.01); *H04N 1/6097* (2013.01); *B29C 37/00* (2013.01); *G06K 15/102* (2013.01); *G06K 2215/0082* (2013.01); *B41M 3/008* (2013.01); *B41J 2/21* (2013.01)

USPC ........... 358/1.9; 358/3.24; 358/502; 358/518; 427/264; 427/265; 427/275; 264/132

(58) Field of Classification Search
USPC ............... 358/1.9, 3.01, 3.24, 3.26, 501, 502, 358/518, 520, 521, 530, 540; 347/1–19, 347/101–107; 382/141–143, 154, 274, 275, 382/285; 700/197, 200; 264/129, 132, 134; 427/256–276

See application file for complete search history.

(56) References Cited

U.S. PATENT DOCUMENTS

| | | | |
|---|---|---|---|
| 7,561,301 B2 * | 7/2009 | Osumi et al. .................... | 358/1.9 |
| 2012/0176633 A1 * | 7/2012 | Koyama et al. ................. | 358/1.9 |

(Continued)

FOREIGN PATENT DOCUMENTS

| | | |
|---|---|---|
| JP | 62-246777 A | 10/1987 |
| JP | 63-104816 A | 5/1988 |

(Continued)

*Primary Examiner* — Scott A Rogers
(74) *Attorney, Agent, or Firm* — Global IP Counselors, LLP

(57) ABSTRACT

A printed layer formation processing device performs a part of a process for forming a printed layer on a part of the print medium by a first colorant in a molded object formation process. The printed layer formation processing device includes: a formation amount correspondence relationship storage part that stores a formation amount correspondence relationship, which is a correspondence relationship between a degree of deformation of the print medium and a formation amount of the first colorant, which are correlated so that the thickness of the printed layer is substantially the same in respective regions of the molded object, a deformation degree acquisition part that acquires the degree of deformation in the respective regions of the print medium; and a formation amount determining part that determines the formation amount of the first colorant in the respective regions based on the degree of the deformation and the formation amount correspondence relationship.

19 Claims, 8 Drawing Sheets

(56) References Cited

U.S. PATENT DOCUMENTS

| | | | |
|---|---|---|---|
| 2012/0182584 A1* | 7/2012 | Koyama et al. | 358/1.18 |
| 2012/0200867 A1* | 8/2012 | Fujita et al. | 358/1.9 |
| 2012/0236367 A1* | 9/2012 | Fujita et al. | 358/3.01 |
| 2012/0307271 A1* | 12/2012 | Ishitoya et al. | 358/1.9 |

FOREIGN PATENT DOCUMENTS

| | | | | |
|---|---|---|---|---|
| JP | 02-090271 A | 3/1990 | | |
| JP | 02-090275 A | 3/1990 | | |
| JP | 07-195817 A | 8/1995 | | |
| JP | 08-137085 A | 5/1996 | | |
| JP | 10-244747 A | 9/1998 | | |
| JP | 11-058927 A | 3/1999 | | |
| JP | 11-119409 A | 4/1999 | | |
| JP | 2005-199625 A | 7/2005 | | |
| JP | 2010082935 A | * 4/2010 | B41J 2/01 |
| JP | 2010-240934 A | 10/2010 | | |

* cited by examiner

| K | C | M | Y | Cl | W |
|---|---|---|---|----|---|
| ⋮ | ⋮ | ⋮ | ⋮ | ⋮ | ⋮ |

| TARGET COLOR (COLOR VALUE) | | | SURFACE AREA DEFORMATION RATE / % | | | | | | | | | | | | | | | |
|---|---|---|---|---|---|---|---|---|---|---|---|---|---|---|---|---|---|---|
| | | | 100% | | | | 150% | | | | 200% | | | | 250% | | | ... |
| | | | INK QUANTITY | | | | INK QUANTITY | | | | INK QUANTITY | | | | INK QUANTITY | | | ... |
| L* | a* | b* | c | m | y | k | c | m | y | k | c | m | y | k | c | m | y | k | ... |
| 40 | 0 | -40 | 70 | 80 | 0 | 0 | 106 | 118 | 0 | 0 | 142 | 159 | 0 | 0 | 178 | 200 | 0 | 0 | ... |
| 40 | 0 | -30 | 60 | 65 | 10 | 0 | 90 | 96 | 15 | 0 | 121 | 130 | 20 | 0 | 152 | 163 | 25 | 0 | ... |
| 40 | 0 | -20 | 48 | 55 | 24 | 0 | 72 | 82 | 36 | 0 | 96 | 110 | 48 | 0 | 121 | 139 | 61 | 0 | ... |
| 40 | 0 | -10 | 33 | 33 | 19 | 9 | 49 | 49 | 28 | 13 | 66 | 66 | 38 | 18 | 83 | 83 | 48 | 23 | ... |
| 40 | 0 | 0 | 15 | 12 | 12 | 30 | 22 | 18 | 18 | 46 | 29 | 24 | 24 | 61 | 37 | 30 | 30 | 77 | ... |
| 40 | 0 | 10 | 0 | 12 | 20 | 15 | 0 | 18 | 29 | 23 | 0 | 24 | 40 | 30 | 0 | 30 | 50 | 38 | ... |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

| | SURFACE AREA DEFORMATION RATE / % | | | | | | | |
|---|---|---|---|---|---|---|---|---|
| | 100% | 125% | 150% | 175% | 200% | 225% | 250% | ..... |
| W INK QUANTITY | 100 | 125 | 155 | 185 | 215 | 245 | 275 | ..... |

Fig. 4

| Element No. | Surface Area Change Rate ΔS |
|---|---|
| 1 | 114% |
| 2 | 128% |
| 3 | 142% |
| 4 | 154% |
| 5 | 166% |
| 6 | 176% |
| 7 | 184% |
| 8 | 191% |
| 9 | 196% |
| 10 | 199% |
| 11 | 200% |
| 12 | 199% |
| 13 | 196% |
| 14 | 191% |
| ⋮ | ⋮ |

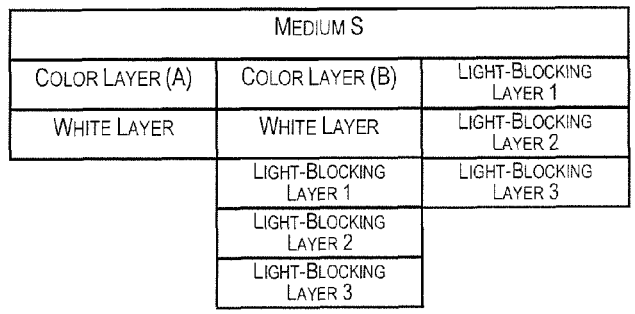
Fig. 12
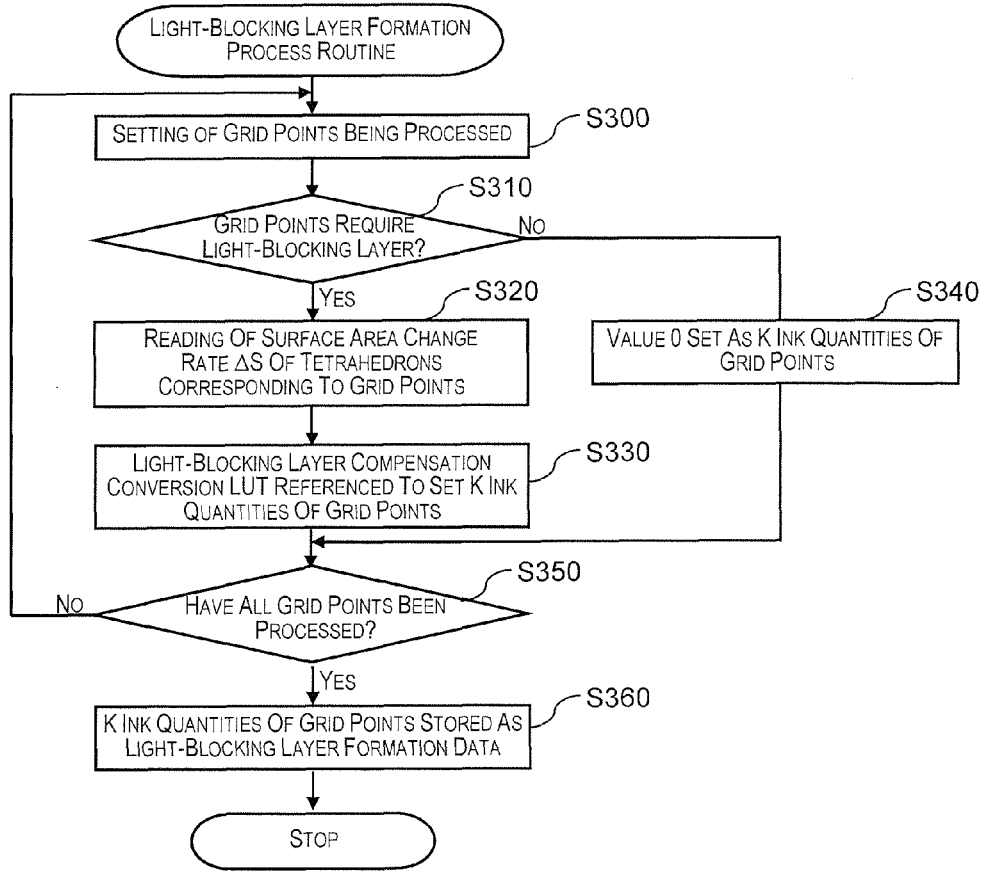
Fig. 13
Fig. 14

DEVICE, METHOD, SYSTEM, AND COMPUTER PROGRAM PRODUCT FOR DETERMINING AMOUNT OF COLORANT TO MAINTAIN THICKNESS OF PRINTED LAYER IN REGIONS OF MOLDED OBJECT BASED ON DEFORMATION OF PRINT MEDIUM

CROSS-REFERENCE TO RELATED APPLICATIONS

This application claims priority to Japanese Patent Application No. 2011-055165 filed on Mar. 14, 2011 and Japanese Patent Application No. 2011-057687 filed on Mar. 16, 2011. The entire disclosures of Japanese Patent Application Nos. 2011-055165 and 2011-057687 are hereby incorporated herein by reference.

BACKGROUND

1. Technical Field

The present invention relates to a printed layer formation processing device, a printed layer formation processing method, a program thereof, and a printed layer formation system.

2. Related Art

An example of this type of printed layer formation processing device that has been proposed in the past is one in which a white-colored transparent ink is transferred to a display screen area on a transparent recording paper, and according to image colors separated into cyan, magenta, and yellow, an image is transferred on top of this transferred white-colored transparent ink (see Japanese Laid-Open Patent Publication No. 11-058927, for example). With this device, transferring an image on top of the white-colored transparent ink makes the transfer image on the transparent recording paper stand out pleasantly and clearly and yields an attractive print seal even when the image is overlaid on a picture of dark colors. There has also been proposed a printing device for printing a color image and a white-colored image using inks of a plurality of colors including white (see Japanese Laid-Open Patent Publication No. 2010-240934, for example).

There has also been proposed a device in which a first printed layer is formed on paper or another substrate by offset printing using colored infrared-absorbent ink on the positive portion of the image being printed, a second printed layer is also formed on the substrate by offset printing using infrared-transmissive ink of the same color on the negative portion of the image, and a camouflage pattern layer is formed on the top layer of the first printed layer and second printed layer by offset printing using an infrared-transmissive ink in order to make it difficult to perceive the infrared-absorbent image pattern (see Japanese Laid-Open Patent Publication No. 10-244747, for example).

There has also been proposed a device in which the characteristics of the condition of deformation of a shape by molding is perceived based on pre-molding data which is a test block copy on which a grid is formed, and post-molding data obtained by scanning a three-dimensional object which is the result of molding what was printed with the test block copy; and when the three-dimensional object is molded based on the perceived characteristics, a block copy is created so as to have the design requested by a designer (see Japanese Laid-Open Patent Publication No. 11-119409, for example). Furthermore, there has been proposed a device in which the strain in a picture before and after molding is calculated and recorded as a mapping function, a printed picture is created which is deformed based on the mapping function so that the strain in the picture is neutralized, the change in film density before and after molding is recorded as a density change function, and the density of the printed picture is corrected based on the density change function (see Japanese Laid-Open Patent Publication No. 2005-199625, for example).

SUMMARY

As is the case with the device disclosed in Japanese Laid-Open Patent Publication No. 11-058927 described above, an attractive result can be achieved by transferring the white-colored transparent ink to the transparent medium to form a white layer and forming the image on top of the white layer, but there is nothing to account for times when the medium is deformed into a three-dimensional shape after the image has been formed. When the medium is deformed, the white layer has a different thickness between regions of small deformation and regions of large deformation. Therefore, the image is made to stand out pleasantly and clearly because the thickness of the white layer is sufficient in regions of small deformation, but since the thickness of the white layer is insufficient in regions of large deformation, there are cases in which the image cannot be made to stand out pleasantly and clearly. Consequently, a problem concerning the thickness of the white layer is that if a region of small deformation is used as a reference, it is not possible to make the image stand out pleasantly and clearly in regions of large deformation, and if a region of large deformation is used as a reference, it is possible to make the image stand out pleasantly and clearly in all of the regions, but since a superfluous white layer is formed in the regions of small deformation, more white-colored ink is consumed that is necessary.

In cases in which only a specified picture is allowed to emit light due to being lit from the back surface, a light-blocking layer must be provided to portions other than the target picture. To achieve a sufficient light-blocking property, the optical density (hereinbelow referred to as the OD value) is preferably a value of 4 or greater. Consequently, there are cases in which light-blocking ink (e.g., black ink) is printed multiple times in layers. After a light-blocking layer has been formed on a transparent, plate-shaped medium of plastic or the like, when the medium is deformed into a three-dimensional shape by molding, the thickness of the light-blocking layer differs between regions of small deformation and regions of large deformation. Therefore, there is a problem in that when the light-blocking layer is formed using a region of small deformation as a reference, a sufficient light-blocking property cannot be obtained in regions of large deformation, and when the light-blocking layer is formed using a region of large deformation as a reference, the regions of small deformation use the same light-blocking ink as the regions of large deformation, and more light-blocking ink is consumed than is necessary.

An object of the printed layer formation processing device, the printed layer formation processing method, the program thereof, and the printed layer formation system of the present invention is to ensure the attractiveness of the image after deformation in decorative molding, and the reduce the used quantity of the colorant of a base color forming the foundation of the image.

Another object is to ensure a light-blocking property after deformation in decorative molding, and to reduce the used amount of the ink or another light-blocking agent for achieving the light-blocking property.

The printed layer formation processing device, the printed layer formation processing method, the program thereof, and the printed layer formation system of the present invention were devised in order to resolve at least some of the problems described above, and can be carried out as the following aspects.

A printed layer formation processing device according to one aspect of the present invention is adapted to perform a part of a process for forming a printed layer on at least a part of the print medium by a first colorant of a predetermined color in a molded object formation process including a step of deforming the print medium to obtain a molded object after the printed layer has been formed. The printed layer formation processing device includes a formation amount correspondence relationship storage part, a deformation degree acquisition part, and a formation amount determining part. The formation amount correspondence relationship storage part is configured to store a formation amount correspondence relationship, which is a correspondence relationship between a degree of deformation of the print medium and a formation amount of the first colorant to be formed on the print medium, which are correlated so that a thickness of the printed layer is substantially the same in respective regions of the molded object. The deformation degree acquisition part is configured to acquire the degree of deformation in the respective regions of the print medium. The formation amount determining part is configured to determine the formation amount of the first colorant in the respective regions of the print medium based on the degree of deformation acquired by the deformation degree acquisition part and the formation amount correspondence relationship.

In this printed layer formation processing device according to the above described aspect of the present invention, a color correspondence relationship is stored which is a correspondence relationship between the degree of deformation of the print medium and the formation amount of the first colorant to be formed on the print medium so that the thickness of the printed layer formed by the first colorant is substantially the same in the molded object obtained by deforming the print medium, the degree of deformation in the respective regions of the print medium is acquired, and the formation amount of the first colorant in all regions of the print medium is determined based on the acquired degree of the deformation and the stored color correspondence relationship. The thickness of the printed layer in the molded object can thereby be substantially the same. Consequently, if the thickness of the printed layer in the molded object is established in advance to be the necessary sufficient thickness, the function in the printed layer of the molded object, i.e., the attractiveness of the image in the molded object can be ensured, and the used quantity of the first colorant can be reduced.

The printed layer formation processing device according to the above described aspect of the present invention may also be configured such that the deformation degree acquisition part is configured to acquire a surface area change rate as the degree of deformation, the surface area change rate being a ratio of a surface area after deformation in the respective regions of the print medium to a surface area before deformation. In this case, the surface area change rate may be calculated based on the surface area before and after deformation of a plurality of minute areas arranged in a surface of the print medium. It is then possible to more accurately reflect the degree of deformation of the print medium.

The printed layer formation processing device according to the above described aspect of the present invention may also be configured such the formation amount determining part is configured to determine the formation amount to be a value 0 for regions in the print medium where determination has been made in advance that the printed layer is not to be formed.

The printed layer formation processing device according to the above described aspect of the present invention may also be configured such that the printed layer has a light-blocking property. The light-blocking property of the printed layer may have an optical density value of 4 or greater.

The printed layer formation processing device according to the above described aspect of the present invention may be configured such that the molded object formation process includes a step of forming an image on the print medium using at least a second colorant of a different color than the first colorant, and the step of forming the printed layer, and a part of the process for forming the printed layer and the image is performed on the print medium. The printed layer can then be used as a foundation (a background) of the image.

The printed layer formation processing device according to the above described aspect of the present invention may also be configured so as to include a color correspondence relationship storage part configured to store a color correspondence relationship, which is a correspondence relationship between the degree of deformation of the print medium, the color before deformation, and the color after deformation reflecting a color change accompanying the deformation, and a color determining part configured to determine the color of the image formed in the respective regions of the print medium based on the degree of deformation acquired by the deformation degree acquisition part and the color correspondence relationship stored by the color correspondence relationship storage part. An image can then be formed on the print medium while precisely reflecting the effect of the change in color caused by deformation of the print medium.

The printed layer formation processing device according to the above described aspect of the present invention may also be configured such that when print data processed by the printed layer formation processing device is outputted to a printer for forming the image by a plurality of colorants including at least cyan, magenta, yellow, black, and white, and the image and the printed layer are formed on the print medium, the white colorant is used as the first colorant.

The printed layer formation processing device according to the above described aspect of the present invention may also be configured such that in an area of the printed layer that overlaps a region of the image that has the color of the first colorant, the formation amount of the first colorant for forming the printed layer is a formation amount that is less than the formation amount of the first colorant of the printed layer in a region of the image that does not have the color of the first colorant. In this case, since the image is formed using the printed layer of the color of the first colorant as a foundation, the attractiveness of the image is not compromised even with less of one colorant. The used quantity of the first colorant can thereby be further reduced.

The printed layer formation processing device according to the above described aspect of the present invention may also be configured such that when print data processed by the printed layer formation processing device is outputted to a printer for forming the image by a plurality of colorants including at least cyan, magenta, yellow, and black, and the image is formed on the print medium, the black colorant is used as the first colorant. The printed layer formation processing device can then be used as a light-blocking layer formation processing device.

The printed layer formation processing device according to the above described aspect of the present invention may also be configured such that when print data processed by the printed layer formation processing device is outputted to a printer for forming the image by a plurality of colorants including at least cyan, magenta, yellow, and black, and the image and the printed layer are formed on the print medium, the color of the printed layer is composite black containing the cyan, magenta, and yellow colorants.

The printed layer formation processing device according to the above described aspect of the present invention may also be configured such that the print medium is transparent, the printed layer has a light-blocking property, and the print data is outputted to the printer so that a process for forming the printed layer overlapping the image is performed after the image has been formed on the print medium. The region of the image over which the printed layer is formed then blocks light, while the region of the image over which the printed layer is not formed does not block light; therefore, it is possible to allow only the region of the image over which the printed layer is not formed to emit light due to the image being lit from the printed layer side.

The printed layer formation processing device according to the above described aspect of the present invention may also be configured such that the printer is configured to form the image using a white colorant in addition to the cyan, magenta, yellow, and black colorants, and the print data is outputted to the printer so that a white layer of the white colorant is formed between the image and the printed layer. It is then possible to suppress instances of the color of the image appearing as discolored from the original color due to the color of the printed layer and the color of the portion where the printed layer is not formed.

The printed layer formation processing device according to the above described aspect of the present invention may also be configured such that the print data is created so that the white layer is formed only in the region where the image is formed.

The printed layer formation processing device according to the above described aspect of the present invention may also include a white correspondence relationship storage part configured to store a white correspondence relationship, which is a correspondence relationship between the degree of deformation of the print medium and the formation amount of the white colorant to be formed on the print medium so that the thickness of the white layer in the molded object is substantially the same, and a white quantity determining part configured to determine the formation amount of the white colorant in the respective regions of the print medium based on the degree of deformation acquired by the deformation degree acquisition part and the white correspondence relationship stored in the white correspondence relationship storage part. The white layer can be given thickness substantially equal to the deformation of the print medium, discoloration of the image due to differences in the thickness of the white layer can be suppressed, and the formation amount of the white colorant can be reduced in comparison with increasing the thickness of the white layer more than necessary.

A printed layer formation processing method according to another aspect of the present invention is adapted to perform a part of a process for forming a printed layer on at least a part of the print medium by a first colorant of a predetermined color in a molded object formation process including a step of deforming the print medium to obtain a molded object after the printed layer has been formed. The printed layer formation processing method includes: acquiring a degree of deformation in respective regions of the print medium; and determining a formation amount of the first colorant in the respective regions of the print medium based on the degree of deformation acquired and a color correspondence relationship, which is a correspondence relationship between the degree of deformation of the print medium and the formation amount of the first colorant to be formed on the print medium, which are correlated so that a thickness of the printed layer is substantially the same in the respective regions of the molded object.

In the printed layer formation processing method according to the above described aspect of the present invention, the degree of deformation in all regions of the print medium is acquired, and the formation amount of the first colorant in all regions of the print medium is determined based on the acquired degree of the deformation and the color correspondence relationship, which is a correspondence relationship between the degree of deformation of the print medium and the formation amount of the first colorant to be formed on the print medium so that the thickness of the printed layer formed by the first colorant is substantially equal in the molded object obtained by deforming the print medium. The thickness of the printed layer in the molded object can thereby be substantially the same. Consequently, if the thickness of the printed layer in the molded object is established in advance to be the necessary sufficient thickness, the function in the printed layer of the molded object, i.e., the attractiveness of the image in the molded object can be ensured, and the used quantity of the first colorant can be reduced.

A non-transitory computer usable medium according to another aspect of the present invention stores a computer program for causing one or more computers to execute steps of the printed layer formation processing method according to the printed layer formation processing method described above.

This program may be recorded on a non-transitory recording medium (e.g., a hard disk, ROM, an FC, a CD, a DVD, etc.) that can be read by the computer, the program may be delivered from one computer to another via a transfer medium (the internet, a LAN, or another communication network), or the program may be transferred in another format. If this program is executed on one computer or is shared among different steps and executed on a plurality of computers, the steps of the printed layer formation processing method described above are executed, and the same operational effects as those of the printed layer formation processing method are therefore obtained.

A printing system according to another aspect of the present invention includes: a personal computer provided with a memory unit including the non-transitory computer usable medium according to the above described aspect of the present invention; and a printer configured to print the printed layer based on print data outputted from the personal computer. In this printed layer formation system, since the steps of the above-described printed layer formation processing method are executed, the same operational effects as those of the printed layer formation processing method are obtained.

BRIEF DESCRIPTION OF THE DRAWINGS

Referring now to the attached drawings which form a part of this original disclosure:

FIG. 2 is an explanatory diagram showing an example of a configuration of nozzle rows of the print head 28;

FIG. 3 is an explanatory diagram showing an example of the color compensation conversion LUT 64;

FIG. 4 is an explanatory diagram showing an example of the white layer compensation conversion LUT 66;

FIG. 12 is an explanatory chart showing an example of the light-blocking layer compensation conversion LUT 68;

FIG. 13 is an explanatory chart for describing an example of the manner in which the medium S is decorated; and FIG. 14 is a flowchart showing an example of a light-blocking layer formation process routine.

DETAILED DESCRIPTION OF EXEMPLARY EMBODIMENTS

Examples

Figure 1:
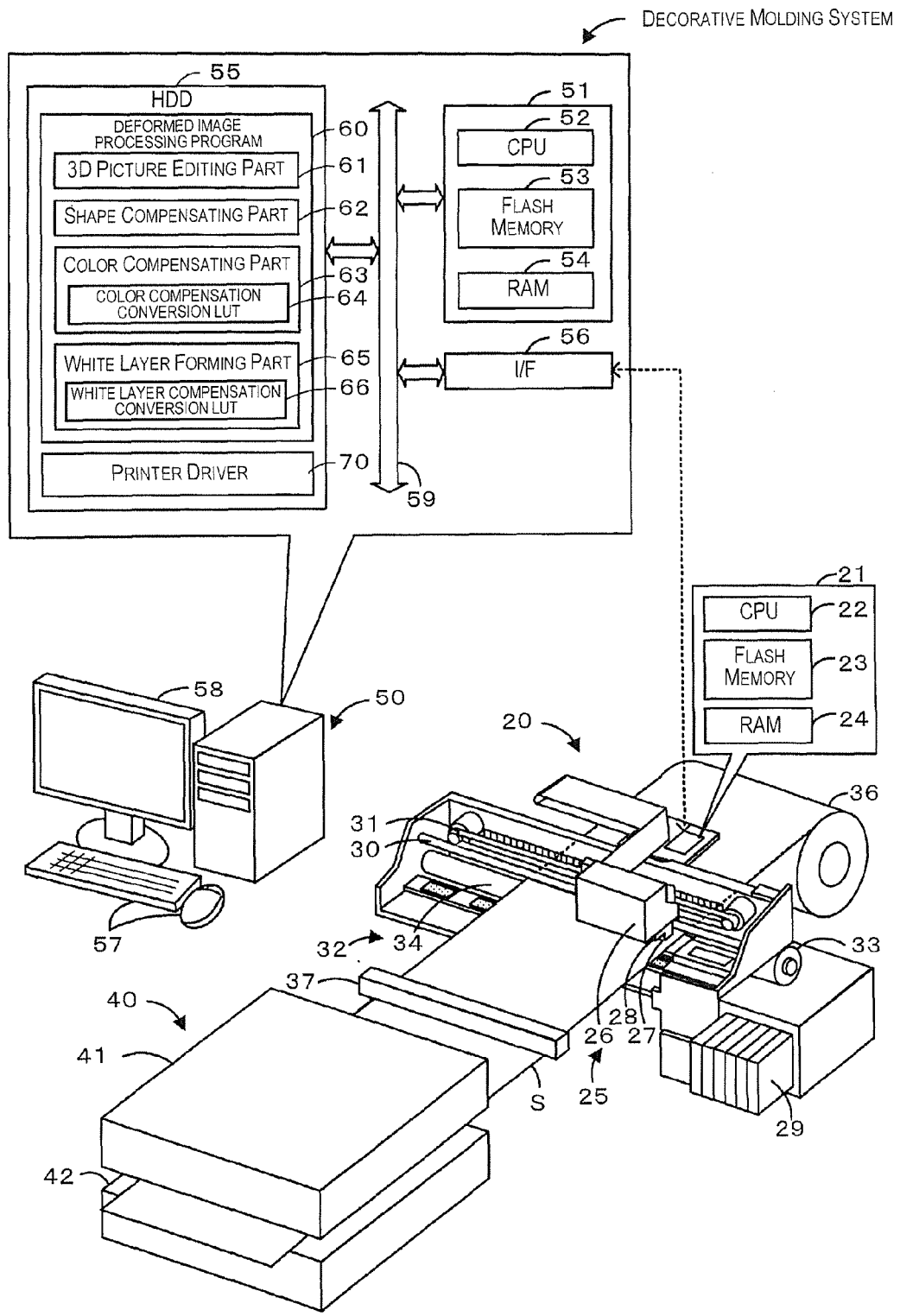
FIG. 1 is a configuration diagram showing an example of a schematic of the configuration of the decorative molding system 10.

Next, embodiments of the present invention are described using the drawings. FIG. 1 is a configuration drawing showing an example of a schematic of the configuration of a decorative molding system 10 having the function of a printed layer formation processing device, which is an embodiment of the present invention. The decorative molding system 10 of the present embodiment comprises a printer 20 for printing an image by pulling a medium S out from a roll 36 composed of the medium S wound into a roll shape, the medium being formed as a transparent resinous sheet (e.g., a polyethylene film), and discharging ink onto the medium; a molding device 40 for three-dimensionally molding the medium S into a three-dimensional shape after an image is printed on the medium; and an all-purpose personal computer (a PC) 50 communicably connected with the printer 20 and having the function of an image processing device for inputting the image to be formed on the medium S, processing the image into print data, and outputting the data, as shown in the drawing. The printed layer formation system preferably comprises at least the printer 20 and the PC 50.

The printer 20 comprises a controller 21 for controlling the entire device, a print mechanism 25 for discharging ink onto the medium S, and a feed mechanism 32 for conveying the medium S while pulling the medium S out from the roll 36. The controller 21, which is configured as a microprocessor centered on a CPU 22, comprises a flash memory 23 capable of storing various processing programs and rewriting data, RAM 24 for temporarily storing data or preserving data, and other components. The controller 21 receives print data from the PC 50, and controls the print mechanism 25 and the feed mechanism 32 so as to execute a print process. The print mechanism 25 comprises a carriage 26 which is moved back and forth to the left and right (in a main scan direction) by a carriage belt 31 along a carriage shaft 30, a print head 28 for applying pressure to the ink and discharging ink droplets from nozzles 27, and a cartridge 29 for accommodating ink of different colors. Through a system in which piezoelectric elements are deformed by applying voltage to the piezoelectric elements to pressurize the ink, the print head 28, which is provided to the bottom part of the carriage 26, discharges the ink of different colors from the nozzles 27 provided in the bottom surface of the print head 28 to form dots on the medium S. The mechanism for applying pressure to the ink may use air bubbles formed by the heat of a heater. The cartridge 29 is mounted on a main body side; clear (cl) and white (w) inks are accommodated separately with the inks of the colors cmyk, which are cyan (c), magenta (m), yellow (y), and black (k); and the accommodated inks are supplied to the print head 28 via tubes (not shown). An example of the arrangement of the nozzles 27 in the print head 28 is shown in FIG. 2. Formed in the print head 28, as shown in the drawing, are six nozzle rows (collectively, the nozzles 27), which are formed as a plurality of discharge holes arranged linearly in the following order from the left: black (k), cyan (c), magenta (m), yellow (y), clear (cl), and white (w). Since the clear (cl) ink is transparent and not colored, it could be improper to consider it ink, but in the present embodiment, it is treated as ink (transparent ink). The feed mechanism 32 has a feed roller 34 or the like which is driven by a drive motor 33 and which conveys the medium S.

The molding device 40 comprises a top die 41 disposed on the side above the medium S, and a bottom die 42 disposed on the side below the medium S. Molds (not shown) are set inside the top die 41 and the bottom die 42, and the medium S is pressed between the top and bottom molds, whereby the medium S is molded into a three-dimensional shape. The molding by the molding device 40 may be hot molding or pressure molding. The molds set in the molding device 40 can be replaced with many different types of molds. Before or after molding the medium S is cut into predetermined lengths by a cutting device 37 disposed between the printer 20 and the molding device 40.

The PC 50 comprises a controller 51 for managing control of the entire device, an HDD 55 as a mass memory storage unit for storing various application programs and various data files, a network interface (I/F) 56 for conducting the input and output of data with the printer 20 and other external devices, an input device 57 such as a keyboard or mouse by which the user inputs various commands, and a display 58 for displaying various information. The controller 51 comprises a CPU 52 for executing various controls, a flash memory 53 for storing various control programs, RAM 54 for temporarily storing data, and other components. The PC 50 has a function for executing an action corresponding to an input operation when the user uses a cursor or the like displayed on the display 58 for an input operation via the input device 57. The controller 51, the HDD 55, the I/F 56, the input device 57, the display 58, and other components are electrically connected by a bus 59, and are configured so as to be capable of exchanging various control signals and data.

Stored in the HDD 55 of the PC 50 are an application program (not shown), a deformed image processing program 60, a printer driver 70, and other components. The deformed image processing program 60 is configured from a program used in order to correct shape drifting or color drifting occurring in the image (including characters, patterns, etc.) formed in the surface of the molded article (the medium S after molding) due to deformation that accompanies the molding of the medium S, a program for forming a white layer as a foundation of the image in order to give the image a clear and attractive appearance, a program for forming a light-blocking layer for blocking light in other portions in order to make part of the image stand out by being lit from behind, and other programs. The deformed image processing program 60 has a 3D picture editing part 61 for editing three-dimensional image (picture) models, a shape compensating part 62 for compensating shape drifting that accompanies molding, a color compensating part 63 for compensating color drifting that accompanies molding, and a white layer forming part 65 for forming a white layer as a foundation of the image.

The 3D picture editing part 61 has a function for executing the editing of images formed on the medium S before molding and the editing of images formed on the medium S after molding. The shape compensating part 62 has a function for executing shape compensation for correcting shape changes in the design (letters and patterns) of the molded article surface, which occur due to modifications in the external shape during molding of the medium S, to the desired shapes.

The color compensating part 63 has a function for executing color compensation for correcting changes in the hue of the image, which occur due to deformation during molding of the medium S, to the desired hue, using a color compensation conversion lookup table (LUT) 64 in order to reflect these changes. The color compensation conversion LUT 64 is a correspondence relationship table which has empirically established the relationships between color values (target colors) of the desired colors to be colored on the molded object of the medium S after deformation, the deformation rate (surface area deformation rate (%)) of the medium S, and the ink quantity formed on the medium S. An example of the color compensation conversion LUT 64 is shown in FIG. 3. In the color compensation conversion LUT 64 as shown in FIG. 3, indicating the color value (target color) and the surface area deformation rate (%)) of the medium S yields the ink quantity of each color that will produce the indicated color value (target color) after the medium S has deformed with the indicated surface area deformation rate (%)). The color compensation conversion LUT 64 is set so that when the color value (target color) remains the same, the greater the surface area deformation rate (%)) after deformation, the greater the amount of colorant formed. By performing conventionally known tetrahedron interpolation processing on the data between the stored values, the color compensation conversion LUT 64 is used as a developed LUT having more grid-point data. In FIG. 3, 100 is shown as the maximum ink quantity used in normal printing as the ink quantity, and only part of the color compensation conversion LUT 64 is shown.

The white layer forming part 65 has a function for using a white layer compensation conversion lookup table (LUT) 66 to execute compensation so that the thickness of the white layer after molding becomes substantially uniform at a predetermined white layer thickness established in advance, because the thickness of the white layer changes due to deformation during molding of the medium S. The predetermined white layer thickness is established by experimentation or the like as the necessary minimum thickness in order to give the image a clear and attractive appearance, regardless of the color of the layer on the side opposite the color layer where the white layer image is formed. The white layer compensation conversion LUT 66 is a correspondence relationship table which has empirically established the relationships between the deformation rate (surface area deformation rate (%)) of the medium S and the white (w) ink quantity in the white layer formed on the medium S. An example of the white layer compensation conversion LUT 66 is shown in FIG. 4. In the white layer compensation conversion LUT 66 as shown in FIG. 4, indicating the surface area deformation rate (%)) of the medium S yields the white (w) ink quantity that will produce the predetermined white layer thickness after the medium S has deformed with the indicated surface area deformation rate (%)). The white layer compensation conversion LUT 66 is set so that the greater the surface area deformation rate (%)) after deformation, the greater the white (w) ink quantity. By performing conventionally known interpolation processing on the data between the stored values, the white layer compensation conversion LUT 66 is used as a developed LUT having more grid-point data. In FIG. 4, 100 is shown as the maximum white (w) ink quantity used in normal printing as the ink quantity, and only part of the white layer compensation conversion LUT 66 is shown.

The printer driver 70 is a program for converting print jobs received from the application program into print data that can be directly printed by the printer 20, and outputting (transmitting) the print data to the printer 20. The printer driver 70 has a function for outputting print data created by the deformed image processing program 60 to the printer 20.

Figure 5:
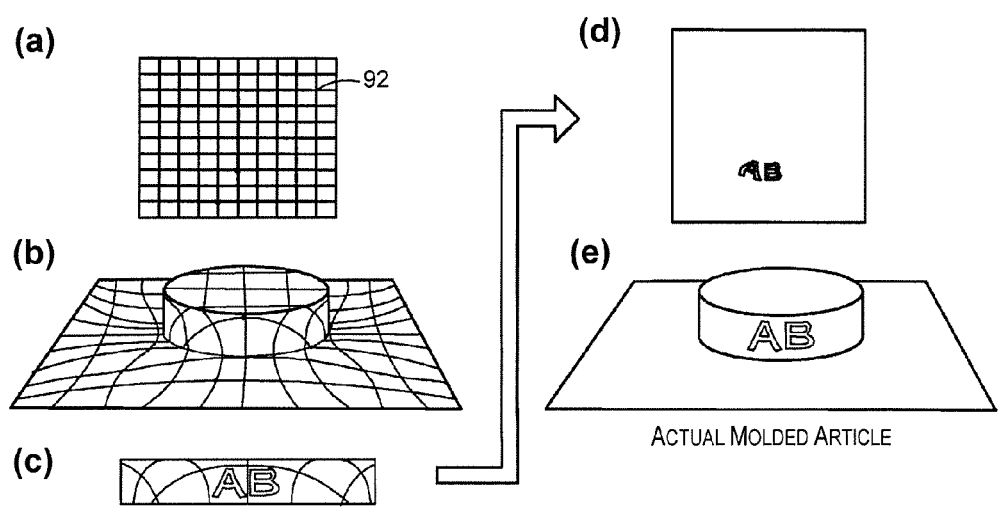
FIG. 5 is an explanatory drawing showing details of the shape compensation process.
Figure 6:
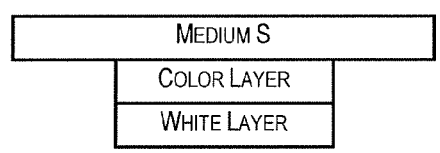
FIG. 6 is an explanatory diagram for describing an example of details decorated on the medium S.

Next, the processes of the decorative molding system 10 of the present embodiment configured in this manner; the shape compensation process, the color compensation process, and the white layer formation process, are described in order. FIG. 5 is an explanatory drawing showing details of the shape compensation process executed by the deformed image processing program 60. In the shape compensation process, the CPU 52 of the controller 51 first creates an image wherein a grid 92 is configured as a flat-surfaced medium, the grid having a plurality of grid points at equal lengthwise and breadthwise intervals and having tetrahedrons (squares) as elements (FIG. 5(*a*)). For the sake of convenience in the drawing, the grid points of the grid 92 are shown as being fewer (more thinned out) than they actually are, and the intervals of the grid points are wider than the intervals at which the dots of the printer 20 are formed (e.g., 720 dpi or 1440 dpi). Position information of the initial positions of these grid points (the positions before deformation) is also stored. Next, a process is performed for deforming the medium so that it is molded into the shape of the desired product, and the position information of the grid points of the grid 92 before and after deformation is inputted to calculate the three-dimensional coordinate positions of the grid points after deformation as well as the strain direction and strain amount of the grid points. Based on the calculation results, a three-dimensional image model of the three-dimensional object after molding is created, and the created three-dimensional image model is displayed on the display 58 (FIG. 5(*b*)). Next, when the position of a picture is indicated on the three-dimensional image model by an input operation by the user, the image to be printed as a picture is placed in the indicated position (FIG. 5(*c*)), and when a two-dimensional conversion command is inputted, coordinate values in three dimensions are converted to two-dimensional coordinate values and the image after conversion is displayed (FIG. 5(*d*)). Thus, an image with the shape that will yield the desired picture after molding is formed on the medium before molding, and block copy data to be printed on the medium S before molding can be created. FIG. 5(*e*) shows a molded article which is the result of printing an image of the block copy data of FIG. 5(*d*) on the medium S and molding. The description of the present embodiment uses as a specific example a case in which a color layer and white layer containing the formed image are formed on the portion of the picture (AB) in FIG. 5(*e*) (the center portion of FIG. 6), and no image or white layer is formed on other portions (the portions of both sides of FIG. 6), as shown in FIG. 6. When portions other than that of the picture (AB) need to have uniform layer thickness, a clear layer of clear (cl) ink may be formed.

Figure 7:
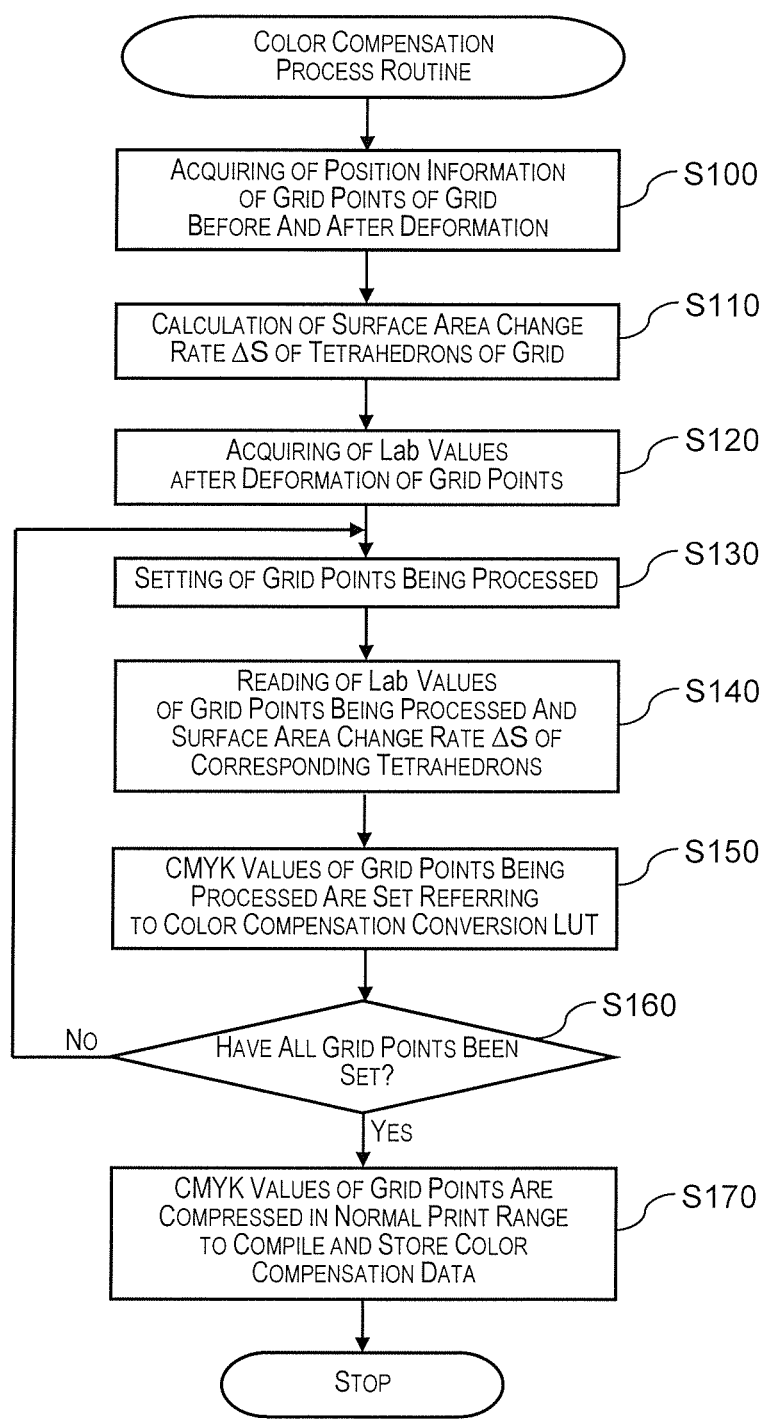
FIG. 7 is a flowchart showing an example of the color compensation process routine.

Next is a description of the color compensation process which uses the color compensation conversion LUT 64. FIG. 7 is a flowchart showing an example of the color compensation process routine executed by the CPU 52 of the controller 51. This routine is stored in the HDD 55 and is executed when a color compensation execution command is inputted after the shape compensation process has been performed. The color conversion execution command is preferably inputted after the shape compensation process, for example, by using the input device 57 to click a color conversion execution button on an editing screen (not shown) of the deformed image processing program 60 while the editing screen is being displayed on the display 58.

Figures 8, 9:
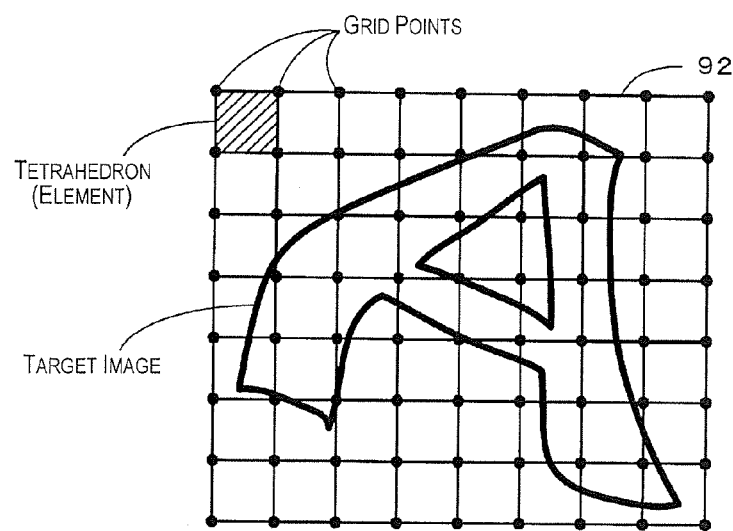
FIG. 8 is an explanatory diagram showing the grid points and tetrahedrons of the grid 92.
FIG. 9 is an explanatory chart showing an example of the calculated surface area change rate Δs of the tetrahedrons.

When this color compensation process routine is executed, the CPU 52 first acquires position information of the grid points of the grid 92 before and after the deforming work (step S100). This acquiring of position information is performed by acquiring the three-dimensional coordinates of the grid points before and after the deformation described in the shape compensation process described above. Next is a calculation of the surface area change rate Δs of the tetrahedrons as the elements of the grid 92 from the acquired grid point position information (step S110). The tetrahedrons of the grid points of the grid 92 are shown in FIG. 9. In FIG. 8, part of the grid 92 is shown enlarged, and the target image (the letter A) in FIG. 8 is part of image after the above-described shape compensation process (see FIG. 5(d)). The calculation of the surface area change rate Δs of the tetrahedrons is performed by calculating the respective surface areas of the tetrahedrons before and after deformation from the position information before and after deformation of the grid points acquired in step S100, and dividing the surface areas of the tetrahedrons after deformation by the surface areas before deformation. Since the surface areas of the tetrahedrons before deformation are all the same, a fixed value may be used. FIG. 9 shows an example of the surface area change rate Δs of the tetrahedrons calculated in this manner. The element No. refers to the tetrahedrons of the grid 92, beginning with the top left and progressing from left to right and then from top to bottom. Lab values of the grid points of the grid 92 are then acquired (step S120). The Lab values can be acquired by determining the color values of the image after shape compensation processing of the positions corresponding to the grid points, based on the RGB values, the CMYK values, and other color information of the inputted image, and converting the determined color values to Lab values. Alternatively, the Lab values can be acquired by displaying on the display 58 an edit screen (not shown) including the image after the shape compensation process such as is shown in FIG. 5(d) or FIG. 8, receiving indications of the image colors using the input device 57, determining the color values of the positions corresponding to the grid points based on the received colors, and converting the determined color values into Lab values.

When the Lab values of the grid points of the grid 92 and the surface area change rate Δs of the tetrahedrons are acquired in this manner, the grid points being processed are set (step S130), and both the Lab values of the grid points being processed and the surface area change rate Δs of the tetrahedrons corresponding to the grid points being processed are read (step S140). The grid points being processed are set beginning with the grid point in the top left corner of the grid 92 and progressing from left to right and then from top to bottom. The tetrahedron corresponding to the grid point being processed can be established as a tetrahedron having the grid point being processed in its top left corner, and in the cases such as those of the grid points positioned in the right end or bottom end of the grid 92, wherein there is no tetrahedron having the grid point being processed in its top left corner, it is preferable to establish the tetrahedron that has the grid point being processed in its top right corner, or the tetrahedron that has the grid point being processed in its bottom left corner or bottom right corner.

Next, the read Lab values are used as color values after deformation and the surface area change rate Δs is used to set the cmyk values, which are the ink quantities before deformation obtained from the color compensation conversion LUT 64, as the cmyk values of the grid points being processed (step S150). In cases in which the read Lab values and surface area change rate Δs have been registered in the color compensation conversion LUT 64, the corresponding values are derived from the color compensation conversion LUT 64 and set as the cmyk values of the grid points being processed. In cases in which the read Lab values and surface area change rate Δs has not been registered in the color compensation conversion LUT 64, approximate cmyk values are extracted from the color compensation conversion LUT 64 and values determined by interpolation processing are set as the cmyk values of the grid points being processed. When the cmyk values as the ink quantities are set in this manner, a determination is made as to whether or not the cmyk values of all the grid points of the grid 92 have been set (step S160), and when there are grid points that have not been set, the routine returns to step S130, the grid points are sequentially set as the objects of processing, and the process is repeated. When cmyk values as ink quantities of all the grid points have been set, the cmyk values of the grid points are compiled as color compensation data and stored in the HDD 55 (step S170), and the routine is ended. When printing uses this color compensation data, for example, first the printer driver 70 or the like is used to perform a process such as interpolating the cmyk values as ink quantities of the grid points of the grid 92 in accordance with the dot-forming intervals of the printer 20. In the present embodiment, since there are also regions in which the cmyk values as ink quantities of the image formation are set as quantities that exceed the normal print range, image formation with cmyk values is performed by executing printing within the normal print range the necessary number of times.

Figure 10:
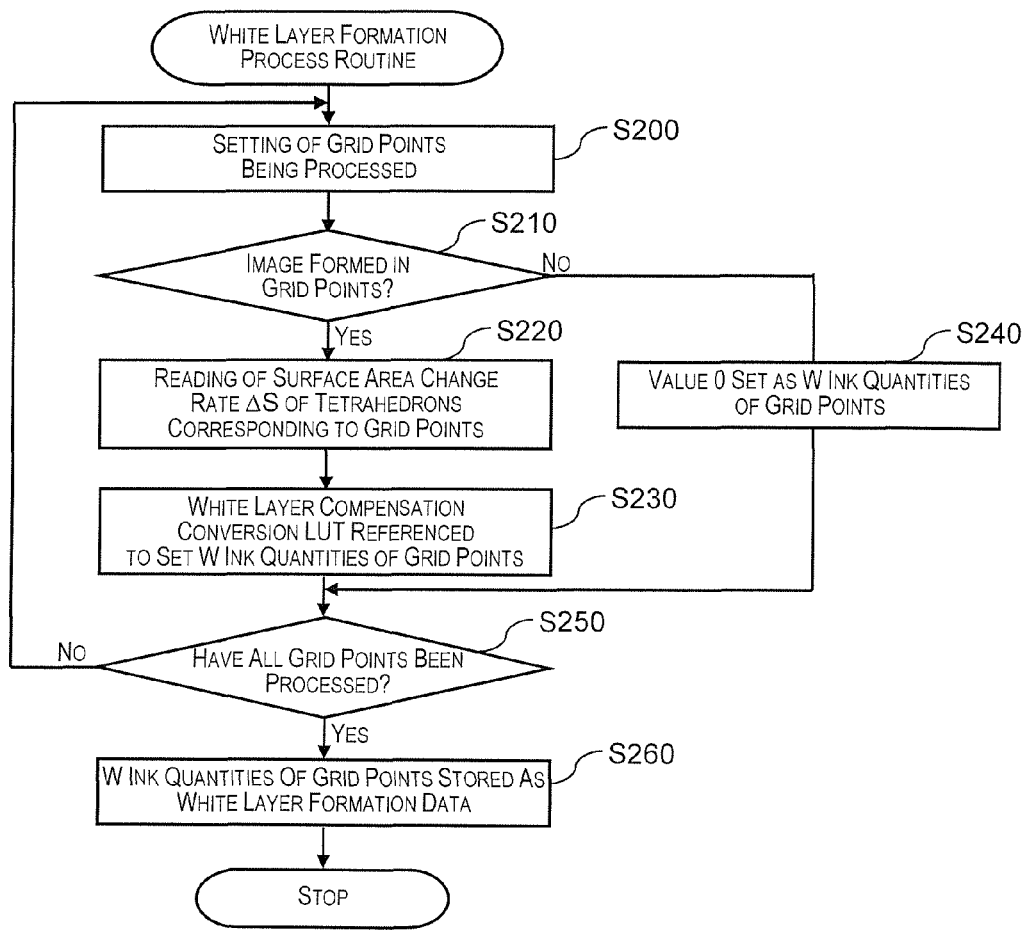
FIG. 10 is a flowchart showing an example of the white layer formation process routine.

Next is a description of the white layer formation process which uses the white layer compensation conversion LUT 66. FIG. 10 is a flowchart showing an example of the white layer formation process routine executed by the CPU 52 of the controller 51. This routine is stored in the HDD 55 and is executed when a white layer formation execution command is inputted after the color compensation process has been performed. The white layer formation execution command is preferably inputted after the color compensation process, for example, by using the input device 57 to click a white layer formation execution button on an editing screen (not shown) of the deformed image processing program 60 while the editing screen is being displayed on the display 58. The white layer formation process may also be executed automatically after the color compensation process has been performed.

When the white layer formation process routine is executed, the CPU 52 first sets the grid points being processed in the medium S (step S200), and then determines whether or not the grid points being processed are grid points in which an image is formed (step S210). This determination can be performed by whether or not Lab values have been set in the grid points being processed. In the example in FIG. 5(e) and FIG. 6, a determination is performed of whether or not they are grid points in which the picture (A) and the picture (B) are formed in FIG. 5(e). When it is determined that the grid points being processed are grid points in which an image is formed, the surface area change rate Δs of the tetrahedrons corresponding to the grid points being processed is read (step S220), and the read surface area change rate Δs is used to set the w values, which are white (w) ink quantities before deformation obtained from the white layer compensation conversion LUT 66, as the w values of the grid points being processed (step S230). In cases in which the read surface area change rate Δs has been registered in the white layer compensation conversion LUT 66, the corresponding values are derived from the white layer compensation conversion LUT 66 and set as the w values of the grid points being processed. In cases in which the read surface area change rate Δs has not been registered in the white layer compensation conversion LUT 66, approximate w values are extracted from the white layer compensation conversion LUT 66 and values determined by interpolation processing are set as the w values of the grid points being processed. When the w values as the white (w) ink quantities are set in this manner, a determination is made as to whether or not all the grid points of the grid 92 have been processed (step S250), and when there are grid points that have not been processed, the routine returns to step S200, the grid points are sequentially set as the objects of processing, and the process is repeated. When it is determined in step S210 that the grid points being processed are grid points in which an image is not formed, there is no need to form a white layer, and the value 0 is therefore set as the w values of the grid points (step S240), the routine advances to step S250, a determination is made as to whether or not all the grid points of the grid 92 have been processed, and when there are grid points that have not been processed, the routine returns to step S200, the grid points are sequentially set as the objects of processing, and the process is repeated.

When it is determined in step S240 that all of the grid points have been processed, the w values of the grid points that have set w values are stored in the HDD 55 as white layer formation data (step S260), and the routine is ended. When a white layer is formed using this white layer formation data, for example, first the printer driver 70 or the like is used to perform a process such as interpolating the w values as ink quantities of the grid points of the grid 92 in accordance with the dot-forming intervals of the printer 20. In the present embodiment, since there are also regions in which the w values as ink quantities for forming a white layer are set as quantities that exceed the normal print range, white layer formation with w values is performed by executing printing within the normal print range the necessary number of times.

Herein is a clarification of the correspondence relationship between the configurational elements of the present embodiment and the configurational elements of the present invention. The HDD 55 of the PC 50 of the present embodiment is equivalent to the "color correspondence relationship storage part" of the present invention, the controller 51 and white layer forming part 65 for executing the process of steps S200 to S220 of the white layer formation process routine of FIG. 10 are equivalent to the "deformation degree acquisition part," and the controller 51 and white layer forming part 65 for executing the process of steps S230 and S260 of the white layer formation process routine of FIG. 10 are equivalent to the "color quantity determination part."

According to the decorative molding system 10 of the present embodiment described above, for grid points in which an image must be formed among the grid points set in the medium S, the surface area change rate Δs of the tetrahedrons is read as a degree of change in the corresponding tetrahedrons in these grid points, and using the read surface area change rate Δs, w values as the white (w) ink quantities before deformation obtained from the white layer compensation conversion LUT 66 are set as the w values of the grid points being processed; therefore, by using these set w values to form a white layer, the white layer can be given thickness substantially equal to the deformation of the medium S, discoloration of the image due to differences in the thickness of the white layer can be suppressed, and the quantity of white (w) ink formed can be reduced in comparison with increasing the thickness of the white layer more than necessary. By forming the white layer to begin with, the image formed on the molded article can be given a clear and attractive appearance even when the molded article is attached to an adherend and there are colors or designs on the surface of the adherend. The white layer may have the property of blocking light, in which case the OD value is preferably 4 or greater.

In the decorative molding system 10 of the present embodiment described above, for grid points in which an image must be formed among the grid points set in the medium S, the surface area change rate Δs of the tetrahedrons is read as a degree of change in the corresponding tetrahedrons in these grid points, and using the read surface area change rate Δs, cmyk values as cyan (c), magenta (m), yellow (y), and black (k) ink quantities before deformation obtained from the white layer compensation conversion LUT 64 are set as the cmyk values of the grid points being processed; therefore, by using these set cmyk values to form an image, an image can be formed on the medium S with a precise reflection of the effect of the changes in color caused by the deformation of the medium S.

In the embodiment described above, the white layer was formed using white (w) ink as a foundation of the image by the printer 20 comprising cyan (c), magenta (m), yellow (y), black (k), clear (cl), and white (w) ink, but a base layer may also be formed using ink of another base color besides white (w), .e.g., light beige, light grey, light pink, or the like as the foundation of the image, by a printer comprising ink of this base color.

In the embodiment described above, the surface area change rate Δs, which is the ratio of the surface area before and after deformation of the tetrahedrons formed on the grid 92, was used as the degree of deformation of the medium S, but other options include using a surface area change rate that is the ratio of the surface area before and after deformation of triangles composed of three grid points near to each other among the grid points formed by the grid 92, using a surface area change rate that is the ratio of the surface area before and after deformation in shapes which are further divisions of the tetrahedrons formed by the grid 92, and using a linear surface area change rate that is the ratio of length before and after deformation between the grid points formed by the grid 92.

In the embodiment described above, the white layer is formed only in regions where the image is formed, but the white layer may also be formed up to a surrounding periphery including the region where the image is formed, or the white layer may be formed over the entire medium S.

In the embodiment described above, the white layer is formed after the image is formed on the medium S, but the image may also be formed on top of the white layer after the white layer has been formed on the medium S.

In the embodiment described above, an image is formed on the medium S by cyan (c), magenta (m), yellow (y), and black (k) ink and a white layer is formed by white (w) ink, but another option is to form an image on the medium S by cyan (c), magenta (m), yellow (y), black (k), and white (w) ink and to form a white layer by white (w) ink. In this case, for white portions of the image, the necessary quantity of white (w) ink used (the quantity formed) to form white when the image is formed may be a small amount such as 50% or 30% of the necessary quantity used, or when a white layer equivalent to the white portions of the image is formed, the necessary quantity of white (w) ink used (the quantity formed) to form the white layer may be a small amount such as 80% or 70% of the necessary quantity used.

In the embodiment described above, the cmyk values as ink quantities of cyan (c), magenta (m), yellow (y), and black (k) before deformation obtained from the color compensation conversion LUT 64 are set to the cmyk values of the grid points being processed, using the surface area change rate Δs of the tetrahedrons as the degree of change in the tetrahedrons corresponding to the grid points, but forming the image need not take into account the deformation of the medium S.

In the embodiment described above, the colorants are inks, but the colorants are not particularly limited to inks as long they are capable of coloring when an image is formed on the medium S. For example, the colorants may be a liquid other than ink, a liquid substance in which particles of a functional material are dispersed (a dispersion liquid), a fluid substance such as a gel, a toner or another powder substance, or the like.

In the embodiment described above, the printer 20 comprises an inkjet print mechanism 25 for discharging ink, but the printer is not limited as such, and may be a laser printer, a heat-transfer printer, or a dot impact printer. A printed layer formation processing device such as the PC 50 is also used, but a printed layer formation processing method may also be used, and the format of a program capable of executing this method may be used.

A preferred embodiment is described above while referring to the accompanying drawings, but the preferred embodiments are not limited to the embodiment previously described. The embodiments can of course be modified in various ways within a range that does not deviate from the scope of the invention, and such modifications can be implemented as follows.

Modifications

Figure 11:
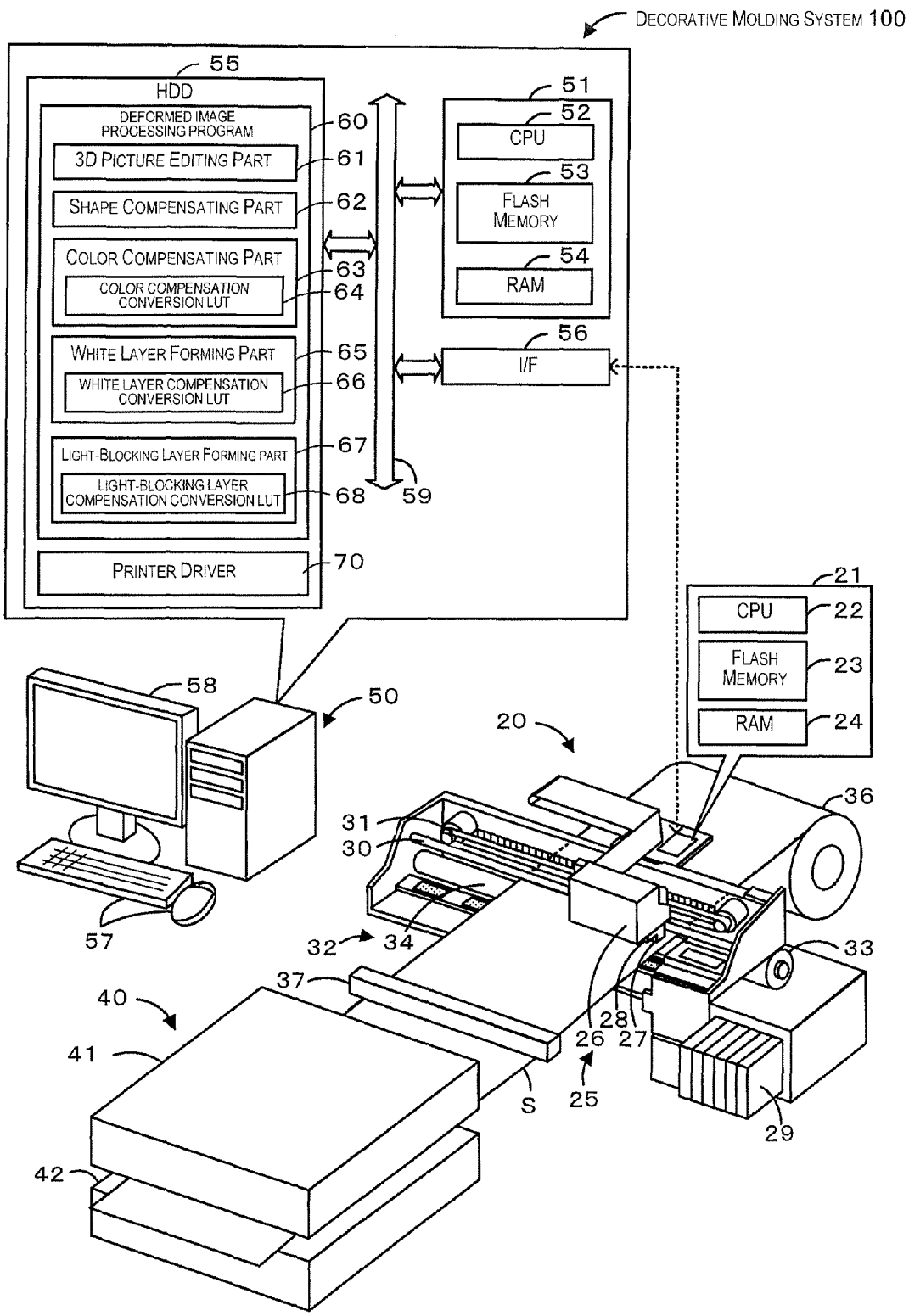
FIG. 11 is a configuration diagram showing an example of a schematic of the configuration of the decorative molding system 100.

FIG. 11 is a configuration drawing showing an example of a schematic of the configuration of a decorative molding system 100 having the function of a printed layer formation processing device, which is a modification of the present invention. The decorative molding system 100 of the present modification differs from the decorative molding system 10 shown in the above example in that the deformed image processing program 60 has a light-blocking layer forming part 67 for forming a light-blocking layer, but otherwise has a configuration nearly identical to the decorative molding system 10 shown in the above example. Consequently, points of difference with the above example are described herein, while configurations and processes identical to the above example are not described.

The decorative molding system 100 of the present modification comprises a light-blocking layer forming part 67 for forming a light-blocking layer.

Because the thickness of the light-blocking layer changes due to deformation of the medium S during molding, the light-blocking layer forming part 67 has a function for using a light-blocking layer compensation conversion lookup table (LUT) 68 to execute compensation so that the thickness of the light-blocking layer after molding becomes substantially uniform at a predetermined light-blocking layer thickness established in advance. The predetermined light-blocking layer thickness is established by experimentation or the like as the thickness of a layer formed from black (k) ink at which the optical density (hereinbelow referred to as the OD value) reaches a pre-established value of 4 or greater. The light-blocking layer compensation conversion LUT 68 is a correspondence relationship table which has empirically established the relationship between the deformation rate (the surface area change rate (%)) of the medium S and the black (k) ink quantity in the light-blocking layer formed on the medium S. FIG. 12 shows an example of the light-blocking layer compensation conversion LUT 68. When the surface area deformation rate (%) of the medium S is indicated in the light-blocking layer compensation conversion LUT 68 as shown in FIG. 12, a black (k) ink quantity is derived that will yield the predetermined light-blocking layer thickness after the medium S has deformed at the indicated surface area deformation rate (%). The light-blocking layer compensation conversion LUT 68 is set to have a tendency such that the greater the surface area deformation rate (%) after deformation, the greater the black (k) ink quantity. By performing conventionally known interpolation processing on the data between the stored values, the light-blocking layer compensation conversion LUT 68 is used as a developed LUT having more grid-point data.

In FIG. 12, 100 is shown as the maximum black (k) ink quantity used in normal printing as the ink quantity, and only part of the light-blocking layer compensation conversion LUT 68 is shown.

Next is a description of the process of the decorative molding system 100 of the present modification configured in this manner. The shape compensation process, the color compensation process, and the white layer formation process are the same as those of the above example and are therefore not described. The light-blocking layer formation process is described hereinbelow.

In the present modification, an example is described in which for the portion of the picture (A) in FIG. 5(*e*), the picture (A) is made to stand out by being lit from behind, and for the portion of the picture (B) in FIG. (e), the picture (B) is not made to stand out by being lit from behind. In this case, in the medium S as shown in FIG. 13, a colored layer (A) in which the image is formed and a white layer are formed in the portion of the picture (A) (the left portion in FIG. 13), and light-blocking layers 1 to 3 are formed in addition to a colored layer (B) and a white layer in the portion of the picture (B) (the center portion in FIG. 13), and only light-blocking layers 1 to 3 are formed in portions having no picture (the right portion in FIG. 13). Thereby, the picture (A) and the picture (B) are visible in light from the medium S (from the front surface), and only the picture (A) is made to stand out and is visible in light from the light-blocking layers (from the back surface). When the layer thickness must be uniform in the portions of the light-blocking layers 1 to 3 in the portion of the picture (A), a clear layer of clear (cl) ink may be formed. Similarly, a clear layer of clear (cl) ink may be formed in portions equivalent to colored layers and white layers in the portions having no pictures.

Next is a description of the light-blocking layer formation process which uses the light-blocking layer compensation conversion LUT 68. FIG. 14 is a flowchart showing an example of the light-blocking layer formation process routine executed by the CPU 52 of the controller 51. This routine is stored in the HDD 55 and is executed when a light-blocking layer formation execution command is inputted after the white layer formation process has been performed. The light-blocking layer formation execution command is preferably inputted after the white layer formation process, for example, by using the input device 57 to click a light-blocking layer formation execution button on an editing screen (not shown) of the deformed image processing program 60 while the editing screen is being displayed on the display 58. The light-blocking layer formation process may also be executed automatically after the white layer formation process has been performed.

When the light-blocking layer formation process routine is executed, the CPU 52 first sets the grid points being processed in the medium S (step S300), and then determines whether the grid points being processed are grid points in which a light-blocking layer must be formed or grid points in which a light-blocking layer need not be formed (step S310). This determination is performed by determining whether or not the grid points have been set in advance as not requiring the formation of a light-blocking layer. In the example in FIG. 6(e) and FIG. 13, for the picture (A) in FIG. 6(e), since the picture (A) is made to stand out by being lit from behind, a light-blocking layer will not need to be formed in the grid points in which the picture (A) is formed, and a determination is therefore performed in step S310 of whether or not they are grid points in which the picture (A) is formed in FIG. 6(e). When it is determined that the grid points being processed are grid points in which a light-blocking layer must be formed, the surface area change rate Δs of the tetrahedrons corresponding to the grid points being processed is read (step S320), and the read surface area change rate Δs is used to set k values, which are black (k) ink quantities before deformation obtained from the light-blocking layer compensation conversion LUT 68, as the k values of the grid points being processed (step S330). In cases in which the read surface area change rate Δs has been registered in the light-blocking layer compensation conversion LUT 68, the corresponding values are derived from the light-blocking layer compensation conversion LUT 68 and set as the k values of the grid points being processed. In cases in which the read surface area change rate Δs has not been registered in the light-blocking layer compensation conversion LUT 68, approximate k values are extracted from the light-blocking layer compensation conversion LUT 68 and values determined by interpolation processing are set as the k values of the grid points being processed. When the k values as the black (k) ink quantities are set in this manner, a determination is made as to whether or not all the grid points of the grid 92 have been processed (step S350), and when there are grid points that have not been processed, the routine returns to step S300, the grid points are sequentially set as the objects of processing, and the process is repeated. When it is determined in step S310 that the grid points being processed are grid points that do not need a light-blocking layer to be formed, there is no need to form a light-blocking layer, and the value 0 is therefore set as the k values of the grid points (step S340), the routine advances to step S350, a determination is made as to whether or not all the grid points of the grid 92 have been processed, and when there are grid points that have not been processed, the routine returns to step S300, the grid points are sequentially set as the objects of processing, and the process is repeated.

When it has been determined in step S340 that all of the grid points have been processed, the k values of the grid points that have set k values are stored in the HDD 55 as light-blocking layer formation data (step S360), and the routine is ended. When a light-blocking layer is formed using this light-blocking layer formation data, for example, first the printer driver 70 or the like is used to perform a process such as interpolating the k values as ink quantities of the grid points of the grid 92 in accordance with the dot-forming intervals of the printer 20. In the present modification, since there are also regions in which the k values as ink quantities for forming a light-blocking layer are set as quantities that exceed the normal print range, light-blocking layer formation with is performed by executing printing within the normal print range with black (k) the necessary number of times.

Herein is a clarification of the correspondence relationship between the configurational elements of the present modification and the configurational elements of the present invention. The HDD 55 of the PC 50 of the present modification is equivalent to the "formation amount correspondence relationship storage part" of the present invention, the controller 51 and light-blocking layer forming part 67 for executing the process of steps S300 to S320 of the light-blocking layer formation process routine of FIG. 14 are equivalent to the "deformation degree acquisition part," and the controller 51 and light-blocking layer forming part 67 for executing the process of steps S330 and S360 of the light-blocking layer formation process routine of FIG. 14 are equivalent to the "formation amount determination part."

According to the decorative molding system 100 of the present modification described above, for grid points in which a light-blocking layer must be formed among the grid points set in the medium S, the surface area change rate Δs of the tetrahedrons is read as a degree of change in the corresponding tetrahedrons in these grid points, and using the read surface area change rate Δs, k values as the black (k) ink quantities before deformation obtained from the light-blocking layer compensation conversion LUT 68 are set as the k values of the grid points being processed; therefore, by using these set k values to form a light-blocking layer, the thickness of the light-blocking layer in the molded article after deformation (FIG. 6(e) can made to be substantially the same. Specifically, the OD values in all parts of the light-blocking layer of the molded article can be established in advance at a value of 4 or greater. Consequently, the light-blocking property of the light-blocking layer of the molded article can be ensured, and the amount of black (k) ink formed as the light-blocking agent can be reduced.

In the decorative molding system 100 of the present modification, for grid points in which an image must be formed among the grid points set in the medium S, the surface area change rate Δs of the tetrahedrons is read as a degree of change in the corresponding tetrahedrons in these grid points, and using the read surface area change rate Δs, w values as the white (w) ink quantities before deformation obtained from the white layer compensation conversion LUT 66 are set as the w values of the grid points being processed; therefore, by using these set w values to form a white layer, the white layer can be given thickness substantially equal to the deformation of the medium S, discoloration of the image due to differences in the thickness of the white layer can be suppressed, and the quantity of white (w) ink formed can be reduced in comparison with increasing the thickness of the white layer more than necessary. By forming the white layer to begin with, the image formed on the molded article can be given a clear and attractive appearance.

Furthermore, in the decorative molding system 100 of the present modification, forming the colored layer in which the image is formed, the white layer, and the light-blocking layer can make the image visible by light from the medium S side (from the front surface) in regions where only the colored layer and the white layer are formed, and can make the image visibly stand out by light from the light-blocking layer side (from the back surface); it can also make the image visible by light from the medium S side (from the front surface) in regions where the colored layer, the white layer, and the light-blocking layer are formed and can impede visibility of the image by light from the light-blocking layer side (front the back surface).

In the modification described above, the light-blocking layer was formed by black (k) ink, but the light-blocking layer may also be formed by composite black using cyan (c), magenta (m), and yellow (y) ink. Another option is that part of the light-blocking layer be formed by black (k) ink, and the rest of the light-blocking layer be formed by composite black. In this case, the side of the light-blocking layer that is near the colored layer containing the image may be formed by black (k) ink, and the rest may be formed by composite black. The light-blocking layer of composite black may be formed when the colored layer is formed.

In the modification described above, the OD values in all parts of the light-blocking layer of the molded article were established in advance at a value of 4 or greater, but the OD values are not limited to being values of 4 or greater, and OD values that at least correspond to the light-blocking property needed in the molded article may be used.

In the modification described above, the surface area change rate Δs of the tetrahedrons was used as the degree of change in the tetrahedrons corresponding to the grid points to set the w values, which were the white (w) ink quantities before deformation obtained from the white layer compensation conversion LUT 66, as the w values of the grid points being processed. However, the deformation of the medium S need not be taken into account when the white layer is formed.

In the modification described above, the colored layer in which the image is formed and the white layer for giving the image a clear and attractive appearance were both formed, but in cases in which the molded article need only be light-blocking, the colored layer and the white layer need not be formed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printed layer formation processing device adapted to perform a part of a process for forming a printed layer on at least a part of the print medium by a first colorant of a predetermined color in a molded object formation process including a step of deforming the print medium to obtain a molded object after the printed layer has been formed, the printed layer formation processing device comprising:
    a formation amount correspondence relationship storage part configured to store a formation amount correspondence relationship, which is a correspondence relationship between a degree of deformation of the print medium and a formation amount of the first colorant to be formed on the print medium, which are correlated so that a thickness of the printed layer is substantially the same in respective regions of the molded object;
    a deformation degree acquisition part configured to acquire the degree of deformation in the respective regions of the print medium; and
    a formation amount determining part configured to determine the formation amount of the first colorant in the respective regions of the print medium based on the degree of deformation acquired by the deformation degree acquisition part and the formation amount correspondence relationship.

2. The printed layer formation processing device according to claim 1, wherein
    the deformation degree acquisition part is configured to acquire a surface area change rate as the degree of deformation, the surface area change rate being a ratio of a surface area after deformation in the respective regions of the print medium to a surface area before deformation.

3. The printed layer formation processing device according to claim 2, wherein
    the surface area change rate is calculated based on the surface area before and after deformation of a plurality of minute areas arranged in a surface of the print medium.

4. The printed layer formation processing device according to claim 1, wherein
    the formation amount determining part is configured to determine the formation amount to be a value 0 for regions in the print medium where determination has been made in advance that the printed layer is not to be formed.

5. The printed layer formation processing device according to claim 1, wherein
    the printed layer has a light-blocking property.

6. The printed layer formation processing device according to claim 1, wherein
    the light-blocking property of the printed layer has an optical density value of 4 or greater.

7. The printed layer formation processing device according to claim 1, wherein
    the molded object formation process includes a step of forming an image on the print medium using at least a second colorant of a different color than the first colorant, and the step of forming the printed layer, and
    a part of the process for forming the printed layer and the image is performed on the print medium.

8. The printed layer formation processing device according to claim 1, further comprising
    a color correspondence relationship storage part configured to store a color correspondence relationship, which is a correspondence relationship between the degree of deformation of the print medium, the color before deformation, and the color after deformation reflecting a color change accompanying the deformation, and
    a color determining part configured to determine the color of the image formed in the respective regions of the print medium based on the degree of deformation acquired by the deformation degree acquisition part and the color correspondence relationship stored by the color correspondence relationship storage part.

9. The printed layer formation processing device according to claim 7, wherein
    when print data processed by the printed layer formation processing device is outputted to a printer for forming the image by a plurality of colorants including at least cyan, magenta, yellow, black, and white, and the image and the printed layer are formed on the print medium, the white colorant is used as the first colorant.

10. The printed layer formation processing device according to claim 9, wherein
in an area of the printed layer that overlaps a region of the image that has the color of the first colorant, the formation amount of the first colorant for forming the printed layer is a formation amount that is less than the formation amount of the first colorant of the printed layer in a region of the image that does not have the color of the first colorant.

11. The printed layer formation processing device according to claim 7, wherein
when print data processed by the printed layer formation processing device is outputted to a printer for forming the image by a plurality of colorants including at least cyan, magenta, yellow, and black, and the image is formed on the print medium, the black colorant is used as the first colorant.

12. The printed layer formation processing device according to claim 7, wherein
when print data processed by the printed layer formation processing device is outputted to a printer for forming the image by a plurality of colorants including at least cyan, magenta, yellow, and black, and the image and the printed layer are formed on the print medium, the color of the printed layer is composite black containing the cyan, magenta, and yellow colorants.

13. The printed layer formation processing device according to claim 11, wherein
the print medium is transparent,
the printed layer has a light-blocking property, and
the print data is outputted to the printer so that a process for forming the printed layer overlapping the image is performed after the image has been formed on the print medium.

14. The printed layer formation processing device according to claim 11, wherein
the printer is configured to form the image using a white colorant in addition to the cyan, magenta, yellow, and black colorants, and
the print data is outputted to the printer so that a white layer of the white colorant is formed between the image and the printed layer.

15. The printed layer formation processing device according to claim 14, wherein
the print data is created so that the white layer is formed only in the region where the image is formed.

16. The printed layer formation processing device according to claim 14, further comprising
a white correspondence relationship storage part configured to store a white correspondence relationship, which is a correspondence relationship between the degree of deformation of the print medium and the formation amount of the white colorant to be formed on the print medium so that the thickness of the white layer in the molded object is substantially the same, and
a white quantity determining part configured to determine the formation amount of the white colorant in the respective regions of the print medium based on the degree of deformation acquired by the deformation degree acquisition part and the white correspondence relationship stored in the white correspondence relationship storage part.

17. A printed layer formation processing method adapted to perform a part of a process for forming a printed layer on at least a part of the print medium by a first colorant of a predetermined color in a molded object formation process including a step of deforming the print medium to obtain a molded object after the printed layer has been formed, the printed layer formation processing method comprising:
acquiring a degree of deformation in respective regions of the print medium; and
determining a formation amount of the first colorant in the respective regions of the print medium based on the degree of deformation acquired and a color correspondence relationship, which is a correspondence relationship between the degree of deformation of the print medium and the formation amount of the first colorant to be formed on the print medium, which are correlated so that a thickness of the printed layer is substantially the same in the respective regions of the molded object.

18. A non-transitory computer usable medium storing a computer program for causing one or more computers to execute steps of the printed layer formation processing method according to claim 17.

19. A printing system comprising:
a personal computer provided with a memory unit including the non-transitory computer usable medium according to claim 18; and
a printer configured to print the printed layer based on print data outputted from the personal computer.

* * * * *